May 6, 1958 R. C. MOORE 2,833,852

COLOR SIGNAL CONTROL SYSTEM FOR COLOR TELEVISION RECEIVERS

Filed March 10, 1951 2 Sheets-Sheet 1

INVENTOR.
ROBERT C. MOORE
BY
Allen V. Hazeltine
ATTORNEY

INVENTOR.
ROBERT C. MOORE
BY
Allen V. Hazeltine
ATTORNEY

United States Patent Office 2,833,852

Patented May 6, 1958

2,833,852

COLOR SIGNAL CONTROL SYSTEM FOR COLOR TELEVISION RECEIVERS

Robert C. Moore, Erdenheim, Pa., assignor to Philco Corporation, Philadelphia, Pa., a corporation of Pennsylvania Application March 10, 1951, Serial No. 214,995

12 Claims. (Cl. 178—5.4)

Figure 1:
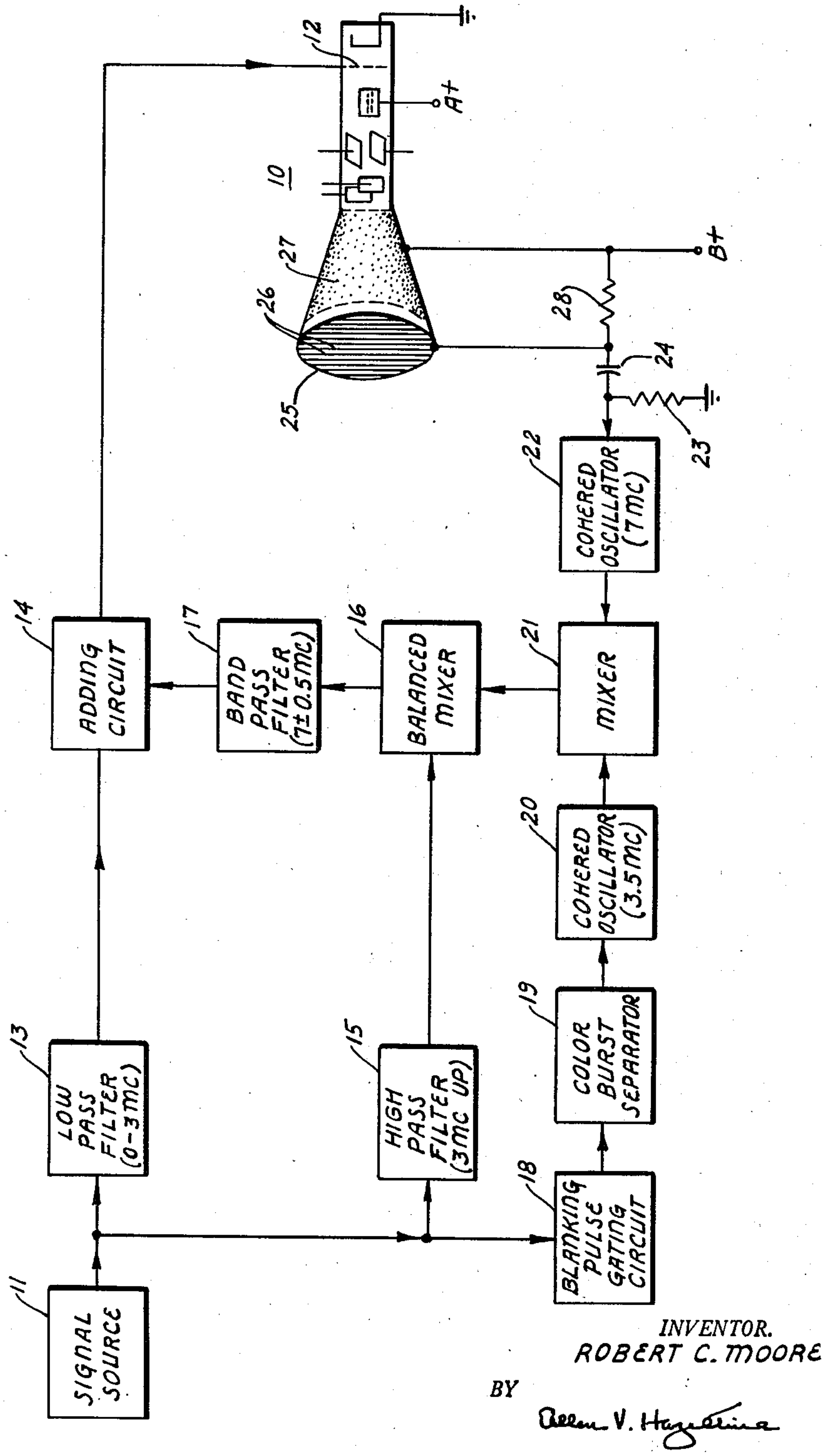

The present invention relates broadly to improvements in color television receivers and, more particularly, to circuit arrangements which are operative to change the rate of occurrence of certain components of the received color television signal so as to place the picture information carried by the signal in the best form for presentation on the receiver display tube.

Although not limited thereto, the invention has been perfected with particular reference to so-called dot-sequential systems of color television. In such a system, there is produced a signal which is successively indicative of the red, green and blue color content of small elements of the scene which is to be televised. For this purpose, there may, for example, be provided three simultaneously scanning television cameras, each of which views the scene to be televised and each of which is equipped with a primary color filter, so that one camera produces a video output signal whose amplitude varies in accordance with the green elements of the scene, while the other two cameras produce output signals respectively indicative of the red and blue scene elements. The amplitudes of the three camera output signals are then sequentially sampled, at equally time-spaced intervals, producing a series of pulses occurring at the sampling instants, and having amplitudes corresponding to the amplitude of the particular signal being sampled, also at the sampling instants. The rate at which this sampling is carried out is very high, being equal to 3.5 megacycles for each signal in some presently contemplated arrangements. These output pulses are then applied to a filter which transforms them into a sinusoidally varying signal of 3.5 megacycle nominal frequency superimposed on a more slowly varying, or average component. After this signal has been combined with the necessary synchronizing signals, it is ready for transmission to distant receivers.

Thus, the color television signal, exclusive of synchronizing signals, consists of a component of slowly time-varying amplitude which is representative of the brightness of the televised scene, together with a sinusoidal component varying at the rate of 3.5 megacycles per second and representative, at cyclically recurrent instants, of the intensity of each of the three primary picture color components. Note that, while this signal is at constant nominal frequency, as determined by the transmitter sampling rate, it is nevertheless subject to both amplitude and phase modulation in accordance with variations in absolute and relative intensities of the primary color elements of the televised scene. For faithful reproduction of this scene, it is therefore essential to transmit and to receive not only the basic color signal of 3.5 mc. nominal frequency, but also the sidebands resulting from amplitude and phase modulation thereof. All this is, of course, well known to those in the art and has been briefly recapitulated here only for convenient reference in considering my inventive improvement.

It may be concluded, from the foregoing discussion, that the 3.5 mc. modulated sine wave is representative of color information at three equally spaced intervals during each cycle. To display this information in visible form at the receiver, it is the present practice to provide a cathode ray tube having small elements of fluorescent material deposited on its face plate to form a viewing screen. The electron beam of the tube is then swept across the screen in a regular pattern in a manner analogous to the operation of present-day black and white television receivers. The instantaneous beam intensity during repetitive sweeps is controlled in accordance with the combined instantaneous amplitudes of both the average brightness component and the 3.5 mc. modulated color component. Assume now that the standard order in which the three color camera output signals are sampled is red, green, blue, then the color signal is representative of these three colors, in the order named, at equally spaced intervals during each cycle. The small fluorescent elements which form the display tube viewing screen are then so chosen that consecutive elements, in the direction of beam traversal, are responsive to electron beam impingement thereon to emit light of the three colors, red, green and blue, respectively, in the same order in which they are represented in the color signal.

According to present standards of television operation, the time required for one sweep of the electron beam across the receiver tube screen is approximately 53.3 microseconds. During this interval there are received roughly 186 complete cycles of the 3.5 megacycle color signal, and there are three times as many, or 558 intervals during which this signal is representative of color intelligence. The ideal arrangement of the screen-constituent elements is then one in which the beam is incident upon an element emissive of a particular color at every interval at which the beam intensity controlling signal is representative of such color.

Unfortunately, simple though this concept may be in theory, its practical realization is beset with well nigh insuperable difficulties.

To begin with, the position of the beam at any instant during each sweep traversal of the screen is dependent upon a complicated beam deflection system whose beam control characteristic cannot, in practice, be made perfectly linear. As a result, the consecutive beam positions in which the beam intensity corresponds to color information will not be equally spaced along each path of beam traversal. Furthermore, this non-linearity may be different for different sweep traversals and may even change from time to time due to aging of deflection system components and the like.

Such uncontrollable sweep non-linearity is, of course, incompatible with the only simple arrangement of the screen elements which is achieved by spacing them equally along the sweep trace of the beam, because the sweep non-linearity will cause non-uniform progress of the beam along its sweep trace, so that, with equally spaced screen elements, the beam will sometimes be incident on a particular element at the exact interval at which its intensity is proportional to information of the proper color, while at other times it will be incident on a particular element at an interval when its intensity is not representative of any color, or even of the wrong color. Note that, with 558 screen elements disposed in the path of each sweep trace, an error of only two-tenths of one percent in the beam deflection near the end of the trace, as compared with the total length of the trace, would result in a positional error of one full screen element, so that the resultant color rendition would be completely erroneous. To obtain accurate color rendition, the linearity would actually have to depart from the ideal by considerably less than two-tenths of one percent. Note further that, even with perfect sweep linearity, errors may still be expected in the spacing of the screen elements, which would again result in improperly timed beam impingement with resultant color distortion.

The difficulties hereinbefore set forth are further aggravated by the fact that it is frequently desirable to vary the number of screen elements in the path of each beam traversal, so that there will no longer be as many elements as there are instants during which the beam intensity is representative of color information. Specifically, this number of elements may have to be intentionally decreased when the size of the screen, and with it the length of each sweep traversal, is made so small that it is physically difficult, or even impossible, in the present state of the art, to accommodate 558 discrete elements therein. On the other hand, and this is the more common situation, it becomes necessary to increase the number of elements when the screen is made so large that adjacent elements are clearly resolved by the eye of the observer at ordinary viewing distances, thereby rendering the elemental structure of the complete color picture unpleasantly conspicuous.

In either case, it is now patently impossible to match each screen element with an instantaneous beam position in which the beam intensity corresponds to color information. Instead, there will either be an excess of screen elements, in which case at least some will emit light not in accordance with color information, or else there will be an insufficiency of screen elements, so that some available color information will remain unutilized.

Either difficulty is completely unavoidable, by any means heretofore devised. Particularly, no improvement in either sweep linearity or element spacing can overcome the color distortion which results from the very nature of the color signal, whenever the number of screen elements per sweep does not equal the number of available items of color information in the received signal.

Accordingly, it is a primary object of the invention to provide means for producing impingement of a cathode ray tube beam upon predetermined cathode ray tube screen elements precisely at the time at which the intensity of the beam corresponds to desired information.

It is another object of the invention to provide means for producing impingement of the beam of a color television display tube upon color emissive elements of the tube screen precisely at the time when the beam intensity is representative of color information.

It is still another object of the invention to provide means, in a color television receiver, for modifying the number of intervals at which color information is available during a given period so as to equal the number of display tube screen elements activated by the display tube beam during the same period.

It is a still further object of the invention to provide means, in a color television receiver for modifying the number of intervals at which color information is available during a given period, without modifying the brightness, hue or chroma represented by the original color information during any finite portion of this period.

A still further object of the invention resides in the inclusion of means in a color television receiver for modifying the rate of occurrence of intervals at which the television signal is representative of color information so as to correspond to the rate at which such information can be displayed.

It is a feature of apparatus embodying my invention that the number of screen elements in the path of each electron beam sweep traversal is entirely independent of the number of items of color information present in the received signal during each sweep interval, so that this number of screen elements may be chosen without restriction to satisfy either the structural exigencies of the tube or the demands of the viewer.

It is another feature of the invention that a television receiver constructed in accordance therewith is not burdened with stringent requirements of sweep linearity. Ordinarily, no better sweep linearity will be required of it, than is customarily provided in black and white receivers.

To realize the foregoing objects and features of the invention, the viewing tube screen structure of a receiver embodying the invention is equipped with elements which provide electrical indications of beam impingement thereon. These "indexing" elements, as they are sometimes called, are known in the art and are provided, for different purposes, in the apparatus described and claimed in copending U. S. application of David E. Sunstein, Serial No. 185,106, filed September 15, 1950, and assigned to the assignee of the present invention. As is fully set forth therein, the indexing elements are incorporated into the screen structure in such a way as to provide an indication of beam impingement on every third color-emissive element. Since the color emissivity of the screen elements is cyclically recurrent every third element, the indexing elements effectively provide an indication of consecutive beam impingements upon elements of the same color emissivity. From these electrical indications provided by the indexing elements, there is derived in accordance with my invention, a sinusoidally varying electrical signal, of frequency equal to the rate of occurrence of the indications and of initially constant amplitude. Note that this sinusoidal signal now bears the same relation to the number of color-emissive elements on the tube face per sweep trace as does the received color signal to the number of items of color information available during one sweep interval. Furthermore, the frequency of this locally generated sinusoidal signal will automatically accommodate itself to unequal screen element spacings as well as to non-linearities of beam sweep. Should the screen elements, for example, be spaced more widely apart in some regions than in others, then the sinusoidal signal frequency will be correspondingly lower during beam traversal of the former regions than during traversal of the latter regions. In any event there will be available a sinusoidal signal which goes through one full cycle in precisely the time required for the beam to sweep across three consecutive color-emissive elements.

As has been previously explained, the received color signal is representative of color intelligence at time spaced intervals which occur, in the exemplary case under consideration, at three different times during each cyclical variation of this signal. However, since this signal is modulated in phase, it alone provides no reliable clue as to the actual occurrence of these intervals. Accordingly there is provided a reference signal which does give an indication of both the times and rate of occurrence of these intervals and which I utilize to establish a phase reference with respect to which signal variations due to intelligence modulation take place. The detailed nature of this reference signal, as well as its novel manner of utilization will appear hereinafter. Suffice it to say, for the time being, that its frequency is indicative of the rate of occurrence of the intelligence representative signal intervals and that its phase is indicative of the times of occurrence of each signal representative interval. Note that the source of this reference signal is immaterial to the practice of my invention. However, in a practical color television system, there is usually transmitted as part of the composite picture signal, an intermittently recurrent color synchronizing signal, which consists of a few cycles at the nominal color signal frequency and constantly phased with respect to the intelligence representative intervals of the signal. This color synchronizing signal is well suited for use as the above-mentioned reference signal and detailed means are hereinafter described for separating the same from the composite signal and utilizing it as follows. A suitable signal having the frequency and phase characteristics of the above-mentioned reference signal is derived therefrom and is first heterodyned with the sine wave derived from the tube indexing elements to produce a combined reference signal having the frequency and phase characteristics of the indexing signal and being of reference phase with respect to received color signal modulation. The combined signal thus produced is then further heterodyned with the received color signal to produce a color output signal which is representative of the intelligence conveyed by the received signal at intervals which now occur at a rate determined by the indexing signal. Thus, if the received color signal, of 3.5 megacycle nominal frequency, has a predetermined amplitude during the first half of a sweep interval, which amplitude diminishes to half its original value for the second half of the sweep interval, due to differences in chroma between the right-hand and the left-hand half of the televised scene, then the color output signal produced in the manner hereinbefore outlined will also diminish to half its initial amplitude during the second half of the beam sweep interval. Similarly phase changes in received signal during any interval of time will be reflected by equal phase changes of the aforesaid ouput signal during the same interval. Thus, while the phase and amplitude of each cycle of the color output signal corresponds exactly to the phase and amplitude of the received color signal during this interval, the frequency of the output signal will be entirely independent of the received signal frequency and dependent only on the actual rate of sweep of the display tube beam across color emissive elements. This output signal, whose phase and amplitude now varies exactly as did the same parameters of the received signal is then combined with the average brightness component of the received signal and supplied to the beam intensity control grid of the display tube. The signal thus used to control the beam intensity now goes through exactly one cycle during the time required for the beam to sweep across each group of three consecutive screen elements. Since each such cycle has the same phase and amplitude characteristics as that portion of the received color signal which occurs during the same interval, there will occur three intervals during each cycle when the beam intensity corresponds to the proper color information, as determined by the phase and amplitude of the color output signal. Therefore, during any finite interval of time the colored light emission from each element will be governed by the phase and amplitude of this color output signal which latter has been shown to be proportional in phase and amplitude to the received signal, during the same interval of time. Consequently, the observable coloration of any region of the screen will be exactly in accordance with the color information of the rceived signal, irrespective of the number of screen elements, of their accuracy of spacing, or of the linearity of the sweep.

Figure 2:
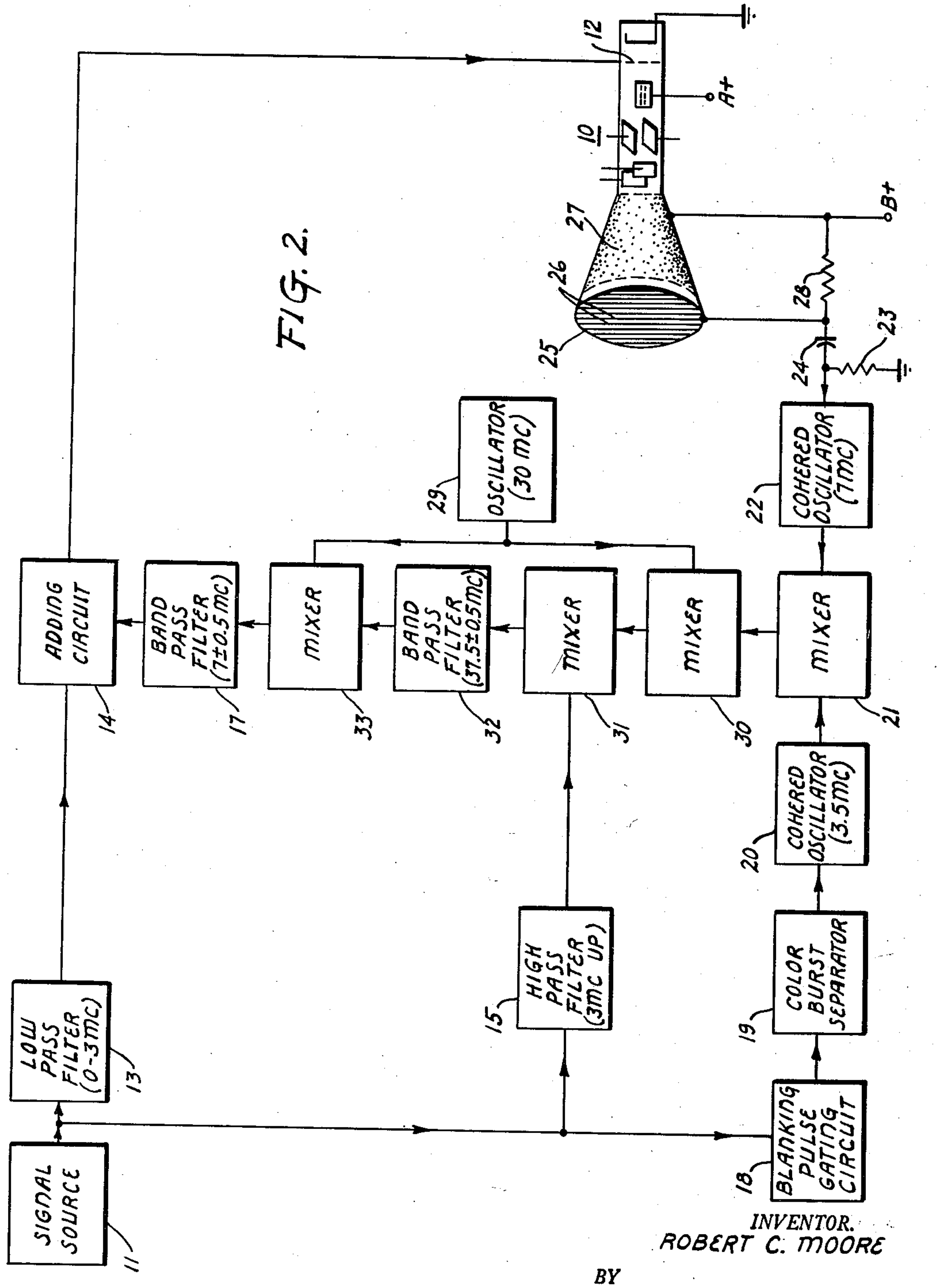

A more complete understanding of my invention may be obtained from the following detailed discussion of several embodiments thereof together with the accompanying drawings illustrative of these embodiments wherein:

Figure 1 shows that portion of a color television receiver which incorporates a relatively simple embodiment of my invention, together with such conventional apparatus as is intimately related thereto; and Figure 2 shows an embodiment of my invention which is superior to the embodiment of Figure 1 in some respects at the cost of considerable increase in circuit complexity.

Referring now more specifically to Figure 1, the arrangement illustrated therein is seen to comprise a color television display tube 10 together with circuits for supplying it with signals and deriving therefrom signals in accordance with the principles of my invention as hereinbefore set forth. These circuits include a signal source 11, under which all-inclusive designation are lumped the conventional circuits of a television receiver including its radio frequency, intermediate frequency, detector and video amplifier stages. Thus, the output signal available at the output of signal source 11 consists of the detected and amplified video signals in the form in which they would normally be applied to the beam intensity control grid 12 of the cathode ray tube 10. In accordance with the invention, such direct application of the signals derived from source 11 is not effected. Instead, these signals are first divided between a multiplicity of parallel paths in accordance with certain of their characteristics which are hereinafter described in detail. One of these paths consists of low pass filter 13 followed by signal adding circuit 14, the output terminal of which latter is directly connected to beam intensity control grid 12. A second path which signals derived from source 11 follow includes the series combination of high pass filter 15, balanced mixer 16, and band-pass filter 17. Certain signals derived from source 11 traverse these components in the order in which they were enumerated. The output of band-pass filter 17 is connected to one input connection of signal adding circuit 14 for purposes hereinafter explained. The third and final parallel path between signal source 11 and beam intensity control grid 12 includes blanking pulse gating circuit 18, color burst separator 19, cohered oscillator 20, and mixer 21, all connected in series circuit relation. Certain signals derived from source 11 are supplied to this path at the input of blanking pulse gating circuit 18 whence they traverse the remaining components of the path in the order in which they were enumerated, the output of mixer 21 being supplied to balanced mixer 16, together with the signal derived from high pass filter 15 for combination therein in the well known manner peculiar to the operation of balanced mixers. In addition to being supplied with certain portions of received signal derived from source 11, as transmitted thereto by way of the aforedescribed third signal path, mixer 21 is further supplied with signals derived from a cohered oscillator 22 for heterodyning therein in the manner peculiar to the operation of mixers. Cohered oscillator 22, in turn, derives its input signal directly from electrical indications produced in R-C network 23, 24 in response to display tube electron beam impingement upon predetermined portions of the tube face 25 of display tube 10. The particular manner in which these indications are derived is also described in detail hereinafter. With the exception of display tube 10, each one of the circuit components hereinbefore listed is of a type that is well known in the art, so that a detailed description of the circuitry of each of these components is not necessary. Furthermore, no invention is predicated upon the inclusion of any one of these components, the novelty of my apparatus residing in their particular combination and cooperative influence upon signals supplied thereto.

Before proceeding with the explanation of the influence of the described combination of circuit components upon such signals, it will contribute to a proper understanding thereof to describe the supplied signals themselves in some detail.

My novel system is supplied with two different signals, one of which is derived from signal source 11 while the other one is derived from display tube 10 in a manner which is hereinafter explained in detail. As has been briefly indicated hereinbefore, the signal derived from signal source 11 is, essentially, the received television signal, heterodyned and detected down to its lowest, or video frequency range. As further indicated, the brightness of the televised scene is represented, in this video signal, by a low frequency signal component located, in a typical case, within the 0 to 3 megacycle frequency range. Superimposed on this low frequency signal, there is a sinusoidally varying signal component of nominal 3.5 megacycle frequency, but subject to phase and amplitude modulation in accordance with color information regarding the televised scene which gives rise to sidebands occupying the three to four megacycle frequency range. Both of these signals, which are representative of picture information, are obliterated at intervals equal to the time required for the transmitter and receiver display tubes to trace out one horizontal line of their scanning patterns, by a so-called blanking pulse which extends in amplitude beyond the most extreme variation of that portion of the signal which is representative of picture information. As is well known, this blanking pulse, when applied to the beam intensity control grid of the receiver display tube, serves to extinguish the beam during retrace, thereby preventing the appearance of retrace lines upon the display tube screen. Superimposed upon the leading half of this blanking pulse, there is a conventional synchronizing pulse of the type common to black-and-white and to color television systems. Upon the trailing half of the blanking pulse, on the other hand, there is superimposed a so-called "color synchronizing burst." Such a burst consists of an odd number of half-cycles of a sine wave having the same frequency as the color signal component but differing therefrom first in that its amplitude is independent of picture content of the composite television signal and secondly in that its phase is likewise independent of such picture content. As a matter of fact, both its amplitude and phase are held substantially constant at the transmitter. Thus, the color burst provides, in the typical case under consideration, a 3.5 megacycle sinusoidal signal cyclically recurrent during consecutive horizontal blanking intervals and of constant phase and amplitude. This is the auxiliary synchronizing signal which has been mentioned hereinbefore and apparatus constructed in accordance with my invention avails itself of its characteristics in a manner hereinafter more fully explained.

As has been briefly indicated in the preceding discussion, the other principal signal with which my novel system is supplied is derived directly from display tube 10. This signal generally takes the form of a pulse cyclically recurrent at intervals corresponding to the time required by the scanning electron beam to traverse any group of three differently color emissive screen elements. Tubes which produce a signal of this general type are known in the art as indexing tubes and their use as well as their details of construction have recently been the subject of considerable activity. A specific type of indexing tube which may, for example, be used in connection with the present embodiment of my invention is illustrated in Figure 5 of the above- identified copending application of David E. Sunstein. Since the details of construction of this tube are thoroughly described in that copending application, they have been omitted from the present discussion. Suffice it to say that the colored light emissive elements of the screen of this tube are disposed in narrow vertical stripes, consecutive stripes being emissive of light of the three primary colors, and the beam being swept across them in a direction transverse to their longitudinal dimension. Because of the multiplicity of such stripes and the confusion which they would create if drawn in the limited space available, the individual color stripes have not been represented in the drawing of Figure 1. However, there has been illustrated an additional set of elements, in Figure 1 diagrammatically represented by vertical lines 26 which are disposed between adjacent groups of three consecutive colored light emissive stripes. These latter, so-called index stripes have, in the particular arrangement under consideration, the property of emitting considerably more secondary electrons in response to impingement by the electron beam than the intervening colored light emissive stripes. As a result, whenever the beam, during its sweep trace traversal, impinges on one of these indexing stripes, the total secondary emission current from the screen will suddenly increase. This emission current is collected by a collecting anode 27, and then passes through index output resistor 28 which is connected between the secondary emission collector electrode 27 and the display tube screen 25. In this manner, there are developed across resistor 28 pulses which are indicative of the actual rate of traversal of the electron beam across groups of three differently color emissive screen elements, taking into account non-linearity of sweep, unequalities of element spacings and independently of the rate at which color information is supplied by the received signal. Since the color emissive screen elements are ordinarily spaced as uniformly as possible, and since non-linearities of sweep are usually not in excess of a few percent, the pulses produced at the indexing output of display tube 10 are recurrent at a fairly regular rate. These pulses may, therefore, be said to have a constant average repetition rate from which they may deviate slightly from time to time due to non-uniform element spacing or sweep non-linearity. The average pulse repetition rate is, of course, proportional to the number of colored light emissive elements which lie in the path of each sweep traversal of the beam across the screen. Thus, for any particular tube screen construction, the average indexing pulse repetition rate is equal to one third the number of screen elements per beam scanning line divided by the time required for the beam to traverse one such scanning line. In a practical case, there may be for example, 372 screen elements emissive of red light, the same number of screen elements emissive of green light and the same number of screen elements emissive of blue light in the path of each sweep trace of the electron beam, or a total of 1,116 colored light emissive screen elements per scanning line. This corresponds to an indexing pulse repetition rate of seven million pulses per second which, as will be noted, is exactly twice the nominal frequency of those components of the received television signal which are indicative of color information. It is also equal to twice the frequency of the aforedescribed color synchronizing burst. Note that, in the case of the provision of a display tube having the aforestated number of colored light emissive elements per scanning line, the condition arises that there are available, on the display tube screen, twice as many elements responsive to impingement of the beam to produce colored light emission as there are instants during which the received color signal corresponds to desired color information. This is then a case in which my novel circuit may be employed to best advantage.

In operation, the received color television signal derived from signal source 11 is separated into various components by filters 13 and 15 and by blanking pulse gating circuit 18. Specifically, filter 13 is arranged to transmit all low frequency components of the received signal which include the synchronizing and blanking pulses as well as the brightness information components of the picture signal. In the case of the typical signal hereinbefore described in detail, this is accomplished by adjusting filter 13 so as to transmit all signal components in the 0 to 3 megacycle frequency range. These low frequency signals transmitted by filter 13 are then directly supplied to adding circuit 14 where they are additively combined with other signals to be fully described. The blanking pulse gating circuit 18 is operative to eliminate from its output signal all of the picture information components of the composite received signal inasmuch as it is transmissive of signal information only during blanking intervals during which time the picture information components are obliterated, as hereinbefore indicated.

Any conventional circuit having these operational characteristics will serve for the purpose. For example, a triode amplifier may be used whose grid is biased so far negatively as to permit the triode to conduct only during the positive signal excursions characteristic of the blanking interval. Thus, the output signal of the blanking pulse gating circuit 18 will be comprised only of the horizontal synchronizing pulses and of the color synchronizing bursts which immediately follow them. Color burst separator 19 is provided in series circuit relation with the output of blanking pulse gating circuit 18 for the purpose of further eliminating horizontal synchronizing pulses. This may be accomplished very simply by a filter which is transmissive of the 3.5 megacycle color burst frequency to the substantial exclusion of all other frequencies. Since the horizontal synchronizing pulse occurs at a much lower rate than this 3.5 megacycle rate, it will not be transmitted by the separator to any appreciable extent so that the output therefrom will consist purely of the aforesaid color synchronizing burst. This output of the separator is now supplied to cohered oscillator 20 where it is, in effect, transformed into a continuous oscillatory signal of exactly the same phase and frequency as the received color burst which latter, it will be recalled, occurs only intermittently. There is thus available, at the output of cohered oscillator 20, a continuous 3.5 megacycle oscillatory signal which is completely locked in phase with the intermittent oscillatory signal of the color bursts. In a somewhat analogous manner, indexing pulses derived from display tube 10 are supplied, by way of R-C network 23, 24 to cohered oscillator 22 which is operative to produce, in response to these pulses supplied thereto, a continuous train of oscillatory signals again exactly locked in phase with the indexing pulses. The output signals of both cohered oscillators 20 and 22 are now simultaneously supplied to mixer 21 where they are heterodyned in the conventional manner to produce an output signal having a component of a frequency equal to the sum of the frequencies of two individual signals prior to heterodyning. With the typical signal values under consideration, this particular component of the output signal will have a frequency of 3.5 plus 7, or 10.5 megacycles. Note, incidentally, that the operation of mixer 21 upon the signals supplied thereto will produce not only a sum but also a difference frequency output component. It is desired to eliminate this difference frequency component from the output signal. Fortunately, this is usually accomplished by the inherent construction of the mixer, which conventionally includes a resonant output circuit tuned to the desired frequency component, in this case the sum frequency component. Should this not be sufficiently selective, additional filters may, of course, be provided for removing the spurious difference frequency components. Since the amplitude of the signals derived from both cohered oscillators is constant, the amplitude of the 10.5 megacycle signal resulting from their heterodyning will also be constant. Its phase, on the other hand, will be proportional to the phase of the signal derived from cohered oscillator 22 only, inasmuch as the phase of the signal derived from cohered oscillator 20 is constant, as hereinbefore indicated. Since the phase of the cohered oscillator 22 output signal, in turn, is directly determined by the rate of occurrence of the indexing pulses derived from display tube 10, the phase of this heterodyne signal which appears at the output of mixer 21 will also be directly determined by the rate of traversal of the display tube beam across colored light emissive elements composing the display tube screen. This sum frequency output signal provided by mixer 21 is supplied to one of the input circuits of balanced mixer 16. To the other input circuit of this mixer 16, there is supplied the high frequency color signal component of the composite received signal, as derived therefrom by means of high pass filter 15 which is adjusted, for operation with the typical signals under consideration, so as to pass all received signals of 3 megacycle frequency or higher, in which range are, of course, included all of the high frequency received signal components indicative of color information. Balanced mixer 16 operates on the signals thus supplied to its input circuit in the manner characteristic of balanced mixers to produce a heterodyned output signal containing signal components of a frequency equal to the difference between the frequencies of the two input signals, in the present case 10.5 megacycles and 3 to 4 megacycles, or 6.5 to 7.5 megacycles. Since mixer 16 also produces, by virtue of its inherent operation, an unwanted output signal of frequency equal to the sum of the two input signal frequencies, the output of the mixer is next put through a band-pass filter transmissive of signals in the 6.5 to 7.5 megacycle range so that only the desired difference frequency component appears at the output of the band-pass filter 17. Note that the difference frequency output of balanced mixer 16 now has an amplitude proportional to the amplitude of the high frequency color components derived from signal source 11 by way of high pass filter 15, while its phase is determined by that of the same received high frequency color signal component as well as by the phase of the indexing signal, which latter is preserved in the output of cohered oscillator 22 as well as mixer 21 which form the intervening stages between the source of the indexing signal and balanced mixer 16. Thus, the output of balanced mixer 16 has a nominal frequency determined solely by the number of color light emissive screen elements in the path of each scanning line of display tube 10, which signal is modulated in amplitude and phase in accordance with the color information of the received signal and is further modulated in phase alone in accordance with phase variations in the indexing signal produced by sweep linearity or unequal spacing of screen elements. This output signal thus possesses all of the characteristics relating to color information which the originally received signal had, the only difference between them being that this color information is available twice as often per unit time, or during any given line interval, than it was in the original signal. Thus this signal, as transmitted by band-pass filter 17 to the exclusion of all other frequency components derived from balanced mixer 16, is in its proper form for recombination with the low frequency, or average brightness components of the received signal and subsequent impression upon the beam intensity modulating electrode 12 of the display tube 10 where it will produce beam intensities corresponding to desired values of color information at the precise instants at which the beam is incident upon colored light emissive elements emissive of the proper color of lights. This recombination is, of course, accomplished in adding circuit 14. It will be understood that the particular ratio of colored light emissive screen elements per scanning line to instants of color information availability per scanning line interval in the received signal with reference to which the preceding discussion was presented, was purely arbitrarily chosen for purposes of illustration. Any other desired ratio, including unity between these two values may be used with equal success, the only adjustment required being in the transmission band of filter 17 which will have to be modified to transmit sum and difference frequency signal components one of whose input components has been changed in frequency.

It has been previously indicated that the phase of the output signal from balanced mixer 16 is determined, inasmuch as it is representative of color information, by the phase of the received high frequency color signal component supplied to one of the input circuits of the balanced mixer. It must be pointed out, in this connection, that, while phase changes in the received signal component will be faithfully reflected in the mixer output signal, they will appear therein in opposite phase to the original phase changes of the received signal. This is the same as saying that if one cycle of the received color signal component is consecutively representative of red, green and blue color information in the order named, then the same information will appear in the output signal of the mixer but in inverse order, that is, each cycle of the mixer output signal will be consecutively representative of blue, green and red color information in the order named. This, of course, in no way impairs the operation of the system as a whole, for this reversal of color information for any group of three differently colored light emissive screen elements can be easily taken care of by disposing the colored light emissive screen elements of the picture tube in the proper order in the path of the scanning electron beam. Since these elements are deliberately placed so very closely together in making up the tube screen as to appear indistinguishable to the eye of the observer, it will make no difference to the latter in which order they are illuminated.

It has been shown, heretofore, that the system illustrated in Figure 1 is fully operative when the number of color emissive elements in the path of each trace of the electron beam is equal to twice the number of color information items available during a line interval in the received signal. It has further been explained that this ratio had been arbitrarily selected for purposes of illustration and that the invention was not confined thereto in its applicability. This statement must now be qualified inasmuch as it will be seen that, while this ratio may be arbitrarily varied it must, nevertheless, be kept fairly large for proper operation of the system of Figure 1. This is because, as the discrepancy between the number of colored light emissive screen elements in the path of each electron beam sweep and the number of color information items in a line interval of the received signal becomes less, the fact that certain of the components of the system fail to operate in the theoretically ideal manner assumes greater importance.

This is particularly true of balanced mixer 16. Balanced mixers, of which numerous embodiments are known in the art, are ordinarily provided for the purpose of mixing two signals supplied thereto to provide an output at the sum and difference frequencies of these two input signals without also providing an output signal component at either of the original input frequencies. While this is possible to achieve in theory, it is well known that practical embodiments of balanced mixers ordinarily fall far short of this ideal so that they not only put out heterodyne components of the two input signals but also components at either or both of the input signal frequencies themselves. This is of no practical importance for applicant's purposes, so long as the two input signals supplied thereto are at widely different frequencies, for then the heterodyne components derived from mixer 21 as the result of beating the signal derived from the indexing stripes of the tube screen against the color burst signals, and the received color signals themselves will both be at widely different frequencies from that of the heterodyne signal which it is desired to derive from balanced mixer 16, so that the band-pass filter 17 through which the mixer output must pass is able to eliminate all but the desired heterodyne frequency signal components even though other signal components such as those of the color signal frequency or of the heterodyne frequency derived from mixer 21 may be present in its output. As the frequency of the signals derived from the indexing stripes approaches the frequency of the color signals, the pass band of filter 17, which is centered about the nominal frequency of these index signals will also approach the frequency range of the received color signals. Then, if these color signals appear in the output of balanced mixer 16, they will be passed by band-pass filter 17 instead of being rejected thereby as desired so that they will also be deleteriously applied to the beam intensity control grid 12 of display tube 10 together with the desired signals derived from the indexing stripes which are phase and amplitude modulated in accordance with the color information borne by the received signal.

A system constructed in accordance with the concepts of the invention and which overcomes this limitation is illustrated in Figure 2 of the drawings to which more detailed reference may now be had. Note, first of all, that several components of the system illustrated in Figure 2 are exactly identical with those of Figure 1 and that these identical components are designated by the same reference numerals to aid in ease of comparative identification. Furthermore, the overall operation of the system is analogous to that of the system shown in Figure 1, in that received color television signals are separated into their low frequency brightness components, high frequency color components and color synchronizing bursts, the high frequency color signals being used to modulate a locally generated signal derived from the indexing stripes of a color display tube, both in amplitude and in phase in accordance with color information carried by the received signal so as to establish precise correspondence between the instants of availability of such color information and the sweep of the display tube electron beam across color emissive screen elements.

For this general purpose, the system of Figure 2 is provided with a display tube 10 which is, in every respect, identical to the similarly numbered display tube of Figure 1 and is particularly characterized by the provision of a screen made up of colored light emissive elements interspersed with indexing stripes 26 which, as has been explained, emit pulse signals in response to impingement by the electron beam during its sweep across the tube face. A signal source 11 similar to the correspondingly numbered one of Figure 1 is also provided, as are low pass filter 13, high pass filter 15, blanking pulse gating circuit 18, color burst separator 19, cohered oscillator 20, mixer 21, cohered oscillator 22, R-C network 23, 24 and adding circuit 14. All of these elements perform exactly the same functions which correspondingly numbered components of Figure 1 perform and which were fully described in connection with that figure. If the same exemplary signal frequency values are used as in Figure 1, then there is available at the output of mixer 21, a signal of 10.5 megacycle frequency, this being the sum frequency component resulting from the heterodyning of the 3.5 megacycle nominal frequency signal derived from cohered oscillator 20 and of the 7 megacycle nominal frequency signal derived from cohered oscillator 22, the latter being phase and amplitude modulated in accordance with the non-linearity of sweep or spacing inequities of color emissive screen elements of display tube 10. Instead of this mixer output being now immediately heterodyned with the high frequency color signals derived from high pass filter 15, as was done in the embodiment of Figure 1, the frequency of these output signals of mixer 21 is first modified still further by heterodyning the latter with the output of a local oscillator operating preferably at a much higher frequency such as, for example, 30 megacycles. This is accomplished in mixer 30 to which both the output of local oscillator 29 and mixer 21 are jointly supplied. There is then available, at the output of mixer 30, a heterodyne component of frequency equal to the sum of the frequencies of the two signals supplied to the mixer, or, in the case under consideration, 40.5 megacycles. Note, however, that the phase modulation of that input signal of mixer 30 which is derived from the output of mixer 21 and which corresponds to phase modulation of the signal derived from the indexing stripes of the display tube will remain unaffected by passage through mixer 30 and will therefore appear as phase modulation of the 40.5 megacycle output component of mixer 30. Thus, the output of mixer 30 is the same as that of mixer 21, with respect to its phase characteristic, the only change therein being that it is now at a much higher frequency than it was at the output of mixer 21. It is this output signal of mixer 30, of greatly increased frequency but identical phase variation, which is applied to mixer 31 for heterodyning with the received high frequency color components derived from high pass filter 15. By virtue of the operation of this mixer 31, the output signal of the mixer contains a signal component of a frequency equal to the difference of the frequencies of the two input signals supplied thereto or, in the present case, 40.5 megacycles minus 3 to 4 megacycles, or 36.5 to 37.5 megacycles. Note that this output component is centered about the difference between the 40.5 megacycle input component derived from mixer 30 and the nominal 3.5 megacycle color signal frequency derived from high pass filter 15. The variations in the frequency of the output signal of mixer 31 are, of course, due to amplitude and phase modulation of the output of high pass filter 15 which is representative of color information and which may produce modulation components, at least in the typical case under consideration, of 0.5 megacycle on either side of the nominal 3.5 megacycle frequency. This difference frequency component of the output of mixer 31 is now selected from all other output components of the same mixer by means of band-pass filter 32 which is arranged to pass signals in the 36.5 to 37.5 megacycle frequency range to the substantial exclusion of all others. The signal transmitter by band-pass filter 32 will then be phase modulated in accordance with the phase modulation of the signal derived from indexing stripes 26 of the display tube and will further be phase and amplitude modulated in accordance with the color information contained in the received high frequency color signal. This signal transmitted by band-pass filter 32 is now again heterodyned with the output of oscillator 29 in mixer 33, band-pass filter 17 being provided to derive, from the output of this mixer 33, the difference frequency between the frequencies of the signal components supplied to mixer 33 or, in other words, a range of signals in the frequency range of 6.5 to 7.5 megacycles. There then appears at the output of band-pass filter 17, a signal of the nominal frequency of the signal derived from indexing stripes 26 of the display tube, phase modulated in accordance with sweep nonlinearity and spacing errors of the screen elements of the tube and further phase and amplitude modulated in accordance with the color information contained in received high frequency color signal. This signal is, thus, similar to the signal derived from similarly designated band pass filter 17 of the system of Figure 1 and is suitable for combination with the low frequency total brightness components derived from low pass filter 13 in adding circuit 14 for subsequent application to the beam intensity control grid 12 of display tube 10 exactly as was done in the embodiment of Figure 1 and with precisely the same beneficial results.

Observe that the system of Figure 2 derives its principal advantages over that of Figure 1 from the additional heterodyning of the output signal of mixer 21 which is effected by mixer 30 wherein the aforesaid output signal of mixer 21 is heterodyned with the output signal of oscillator 29. Since this oscillator, as prescribed, is deliberately picked to operate at a frequency far outside the range of either the received color signal or the signals derived from the indexing stripes of the display tube, its addition to the heterodyne component resulting from the mixing of the latter two signals will, as has been seen, produce a heterodyne sum frequency component at a frequency which is considerably different from that of the original received color signal or of the indexing signal irrespective of whether these two differ much or little from each other. As a result, it is possible to separate desired heterodyne components in the output of mixer 31 by a simple band-pass filter, even though components of mixer input signal frequency are also present in its output. In fact, by the provision of the apparatus of Figure 2, my inventive concept may be carried into practice even though the received color signal and the indexing signal are of exactly the same nominal frequency, in which case, as has been indicated hereinbefore, my system corrects simply for non-linearities of sweep and the inequalities of spacing of colored light emissive elements in the display tube. However, even this latter improvement by itself is substantial and will, in many cases, justify the additional apparatus required to practice my invention.

In this connection, it should be pointed out that the embodiment of Figure 2 possesses the further advantage that the final signals derived from band-pass filter 17 and suitable for application to adding circuit 14 will now have not only the proper color information at the proper time but also the same phase as these original color signals, instead of having the opposite phase as was the case in the embodiment of Figure 1. This is again due to the additional double heterodyning carried out by mixers 30 and 33. Thus, when using the system of Figure 2, it will not be necessary to reverse the order of occurrence of the various colored light emissive elements of the tube screen with respect to the order in which the received color signal is representative of such colors.

While the signal derived from the indexing structure of the tube should, of course, be indicative of the rate of beam sweep traversal across the tube screen structure, it is by no means necessary that the actual frequency of the signal be the same as that rate. On the contrary, for reasons which are foreign to the present discussion, it is sometimes desired to modify the index signal so that its frequency becomes very different from the rate of index stripe traversal, while retaining, however, in the modified signal, the phase variations indicative of sweep nonlinearity and inequality of screen element spacing.

In such a case, the cohered oscillator 22 is, of course, tuned to this modified frequency and mixer 30 may be omitted, since the heterodyne signal component produced by mixer 21 will inherently differ sufficiently in frequency from the nominal frequency of the received color signal. Mixer 33 must, of course, be retained, while local oscillator 29 will be returned so that mixer 33 will produce a heterodyne signal component of the actual frequency desired for application to the display tube grid as determined by the rate of beam sweep traversal across the tube indexing structure.

Note that one important precaution which must be observed in both embodiments is to adjust the gain of the two channels followed by the low frequency brightness signals and the high frequency color signals, respectively, so that their relative amplitudes, after recombination in adding circuit 14 will be substantially the same as their original relative amplitudes prior to separation, otherwise unfaithful color reproduction will result.

Briefly summarizing then, either of the systems, illustrated in Figures 1 and 2 permit the received high frequency color signal to operate upon a locally generated signal, which latter is potentially capable of containing the proper number of items of color information for registry of the same with the colored light emissive elements of the display tube, so as to impart to the latter its amplitude and phase characteristics which convey its color information. It is this locally generated signal, governed in phase and amplitude with accordance with received color information, which is then applied to the beam intensity control grid of the display tube, together with the unmodified low frequency brightness component of the received signal, to control the illumination of the colored light emissive elements and reproduce a faithful colored reproduction of the televised scene.

It will be understood that numerous modifications of these specific embodiments will occur to those skilled in the art without departing from my inventive concept. I therefore desire to limit this concept only by the scope of the appended claims.

I claim:

1. An electrical system comprising: a source of a first cyclically varying signal representative of intelligence at a phase positioned interval during each cycle of said signal; a source of a second cyclically varying signal having the same frequency as said first signal and being thereby indicative of the rate of occurrence of said intervals; a source of a third cyclically varying signal of independently determined frequency; a first mixer coupled to said sources of second and third signal; means for deriving from said mixer a signal proportional to a heterodyne signal component produced by mixing of said second and third signals; a second mixer coupled to the last-named means and to said source of first signal; and means for deriving from said second mixer a cyclically varying heterodyne signal component proportional to said intelligence representative signal at a correspondingly phase positioned interval during each cycle of said last-named signal component, said interval recurring at a rate proportional to said independently determined frequency.

2. An electrical system comprising: a source of a first signal of predetermined average frequency and whose phase departure from a reference phase is representative of intelligence; a source of a second signal of said average frequency and of reference phase; a source of a third signal of independently determined frequency; a first mixer coupled to the said sources of second and third signal; means for deriving from said mixer a heterodyne component produced by mixing of said signals; a second mixer; means for supplying said third signal and a signal proportional to said heterodyne component to said second mixer; and means for deriving from said second mixer a heterodyne component of average frequency proportional to said independently determined frequency and whose phase varies in proportion to the intelligence representative phase departure of said first signal.

3. An electrical system comprising: a source of a first cyclically varying signal of predetermined frequency, said signal being representative of individual intelligence components at a plurality of time spaced intervals during each cycle; a source of a second cyclically varying signal having said predetermined frequency; a source of a third cyclically varying signal of independently determined frequency; a first mixer coupled to said sources of second and third signal; means for deriving from said mixer a heterodyne component produced by mixing of said second and third signals; a second mixer coupled to said means and to said source of first signal; and means for deriving from said second mixer a cyclically varying heterodyne component lying in a frequency range which includes said independently determined frequency and proportional to said intelligence representative signal at corresponding intervals during each cycle.

4. An electrical system comprising: a source of a first cyclically varying signal which is representative of intelligence at an interval during each cycle; a source of a second cyclically varying signal having the same frequency as said first signal and being thereby indicative of the rate of occurrence of said intervals; a source of a third cyclically varying signal of independently determined frequency; a first mixer coupled to said sources of second and third signal; means for deriving from said mixer a heterodyne component produced by mixing of said signals; a second mixer; a source of a fourth signal of frequency differing from that of any other of said signals; means for supplying to said second mixer the component derived from said first mixer and said fourth signal; means for deriving from said second mixer the sum frequency heterodyne component produced by said mixer, a third mixer; means for supplying to said third mixer said first signal and the component derived from said second mixer; and means for deriving from said third mixer a cyclically varying heterodyne component proportional to said intelligence representative signal at a corresponding interval during each cycle of said last-named heterodyne component, said interval recurring at a rate proportional to said independently determined frequency.

5. An electrical system comprising: a source of a first cyclically varying signal which is representative of intelligence at an interval during each cycle; a source of a second cyclically varying signal having the same frequency as said first signal and being thereby indicative of the rate of occurrence of said intervals; a source of a third cyclically varying signal of independently determined frequency; a first mixer coupled to said sources of second and third signals; means for deriving from said mixer a heterodyne component produced by mixing of said signals; a second mixer; a source of a fourth signal of frequency differing from that of any other of said signals; means for supplying to said second mixer said fourth signal and the component derived from said first mixer; means for deriving from said second mixer the sum frequency heterodyne component produced by said mixer; a third mixer; means for supplying to said third mixer said first signal and the component derived from said second mixer; means for deriving from said third mixer a heterodyne component produced by said mixer; a fourth mixer; means for supplying to said fourth mixer said fourth signal and the component derived from said third mixer; and means for deriving from said fourth mixer a cyclically varying heterodyne component proportional to said intelligence representative signal at a corresponding interval during each cycle of said last-named heterodyne component, said interval recurring at a rate proportional to said independently determined frequency.

6. An electrical system comprising: a first source of signals having components in different frequency bands; means for separating the components in one band; a signal combining means; means for channeling the separated components to said combining means; means for deriving from the components in the other band a first signal which at time spaced intervals is representative of intelligence; means for producing a second signal having a frequency indicative of the rate at which said intervals occur; a source of a third signal having an independently determined frequency; means responsive to said second and third signals to produce a fourth signal having a frequency proportional to a heterodyne component of said second and third signals; means responsive to said first and fourth signals to produce a fifth signal which is representative of the said intelligence at time spaced intervals occurring at a rate proportional to the frequency of said third signal; and means for channeling said fifth signal to said signal combining means.

7. An electrical system comprising: a source of a first signal which at time spaced intervals is representative of intelligence; a source of a second signal having a frequency indicative of the rate at which said intervals occur, a cathode ray tube adapted to produce visible indications of said intelligence at independently time spaced intervals; indexing means for deriving from said cathode ray tube a third signal indicative of the rate at which said indications are produced; means responsive to said second and third signals to produce a fourth signal proportional to a heterodyne component of said second and third signals, and means responsive to said first and fourth signals to produce a fifth signal which is representative of the said intelligence at time spaced intervals occurring at a rate proportional to the frequency of said third signal.

8. In a color television receiver, a display tube having screen elements responsive in different colors to electron beam impingement as the beam successively scans said elements during each line scanning, and also having indexing means to generate a control signal, a source of a composite chrominance signal in the form of a single alternating wave having successively occurring portions representative of different selected color components of the image to be reproduced, means for utilizing said control signal to transform said chrominance signal into a single alternating signal having successive portions representative of one of said color components occurring at substantially the same rate as successive impingements of said beam on the corresponding color elements of said tube, and means for applying the transformed chrominance signal to said tube to modulate the intensity of said beam accordingly.

9. In a color television receiver, a display tube having screen elements responsive in different colors to electron beam impingement as the beam successively scans said elements during each line scanning, and also having indexing means to generate a control signal, a source of a luminance signal representative of the brightness detail of the image to be reproduced, means for applying said luminance signal to said tube to modulate the intensity of said beam, a source of a composite chrominance signal having successively occurring portions representative of different selected color components of the image to be reproduced, means for utilizing said control signal to modify said chrominance signal so that successive portions representative of one of said color components occur at substantially the same rate as successive impingements of said beam on the corresponding color elements of said tube, and means for applying the modified chrominance signal to said tube to modulate the intensity of said beam accordingly.

10. An electrical system comprising: a source of a cyclically varying signal representative of intelligence at a phase positioned interval during each cycle of said signal; a source of a cyclically varying signal having the same frequency as said first signal and being thereby indicative of the rate of occurrence of said intervals; a source of a cyclically varying signal of independently determined frequency; a first mixer coupled to two of said sources of signals; means for deriving from said mixer a signal proportional to a heterodyne signal component produced by mixing of the signals from said two sources; a second mixer coupled to said last-named means and to the third of said signal sources; and means for deriving from said second mixer a cyclically varying heterodyne signal component proportional to said intelligence representative signal at a correspondingly phase positioned interval during each cycle of said last-named signal component, said interval recurring at a rate proportional to said independently determined frequency.

11. In a color television receiver: a display tube having screen elements responsive in different colors to electron beam impingement as the beam successively scans said elements during each line scanning, and also having indexing means to generate a control signal; a source of a composite chrominance signal having successively occurring portions representative of different selected color components of the image to be reproduced; a source of a reference signal having a frequency indicative of the rate of occurrence of said color representative portions of said chrominance signal; means for heterodyning two of said signals with each other, to produce a resultant heterodyne signal component; means for heterodyning said resultant component with the third of said signals to produce a signal having portions representative of one of said selected color components occurring at a rate substantially equal to the rate of impingement of said beam on the corresponding color elements of said tube; and means for applying said last-mentioned signal to said tube to modulate the intensity of said beam accordingly.

12. In a color television receiver: a display tube having screen elements responsive in different colors to electron beam impingement as the beam successively scans said elements during each line scanning, and also having indexing means to generate a control signal; means for deriving from said indexing means a control signal of a frequency proportional to the rate of successive impingements of said beam on color elements of said tube; a source of a composite chrominance signal in the form of a single alternating wave having successively occurring portions representative of different selected color components of the image to be reproduced; means for utilizing said control signal to transform said chrominance signal into a single alternating signal having successive portions representative of one of said color components occurring at substantially the same rate as successive impingements of said beam on corresponding color elements of said tube; and means for applying the transformed chrominance signal to said tube to modulate the intensity of said beam.

References Cited in the file of this patent

UNITED STATES PATENTS

| | | |
|---|---|---|
| 2,276,006 | Armstrong | Mar. 10, 1942 |
| 2,406,932 | Tunick | Sept. 3, 1946 |
| 2,451,430 | Barone | Oct. 12, 1948 |
| 2,513,159 | Fredendall | July 27, 1950 |
| 2,635,141 | Bedford | Apr. 14, 1953 |
| 2,648,722 | Bradley | Aug. 11, 1953 |
| 2,677,721 | Bedford | May 4, 1954 |
| 2,697,742 | Evans | Dec. 21, 1954 |